Patented Nov. 11, 1947

2,430,796

UNITED STATES PATENT OFFICE 2,430,796

RECOVERING SOLIDIFIED LIQUIDS

Sol B. Wiczer, Washington, D. C.

No Drawing. Application November 13, 1945,
Serial No. 628,371

2 Claims. (Cl. 252—349)

The present invention relates to the method of reclaiming the liquid which has been gelated or solidified by dissolving in the liquid an amorphous substance in quantity exceeding the solubility therein at normal temperatures by hydraulically floating and pressing the gel thru a medium capable of breaking the gel.

In my copending application 438,330, filed April 9, 1942, now Patent 2,388,719, issued November 13, 1945, of which the present application is a continuation-in-part, I have disclosed a particular gel formed by a gelating agent which is inherently a stabilizing agent for the gelated liquid together with the present method of recovering or reclaiming the liquid from the gel.

It will be understood that for purposes of the invention herein disclosed and claimed practically any gel may be broken and the liquid recovered therefrom by pumping a liquid into the bottom of a tank or container wherein the gel is stored which preferably is immiscible with or relatively insoluble in the liquid to be recovered, the gelating agent or both.

Typical liquids which are desirably gelated are hydrocarbon naphthas such as gasoline, benzene etc., cleaning solvents, chlorinated hydrocarbons etc., spray oils, vegetable and animal glyceride oils, solvents such as alcohol, acetone etc.

Typical gelating agents are soaps, waxes such as paraffin wax nitrocellulose, cellulose acetate, albumen and those disclosed in my parent application.

In general the gels will be made in the usual manner known in the art consisting in causing the gelating agent to dissolve in the liquid to be solidified by using heat, cold or solvents and allowed to set by return to normal temperature removal of solvents or addition of coagulating media etc.

To recover, for example, a solidified fuel, such as gasoline the fuel as contained in a large storage tank is floated by pumping water into the bottom of the tank, the floated gel being compressed by the water against any kind of fine screen or porous body filter fixed in the outlet at the top of the tank. On being forced thru the screen the gel structure is broken and the liquid passes on thru. By this practice the gasoline is withdrawn from the tank as rapidly as needed by pumping water into the storage tank under sufficient pressure to squeeze the gasoline out of the gel.

Other liquids besides water may be employed to separate the gasoline or other solidified liquid from the solidifying agent and in general the character of the flotation liquid will depend on the liquid and solidifying agent to be separated. Thus to separate solidified alcohol it may be more desirable to use hydrocarbon or other less soluble substance to effect the separation. It is also possible to break the gel by pumping more of the liquid, which has been solidified into the bottom of the tank. In such case the liquid becomes only a medium for transfer of hydraulic pressure, and is not so effective as other immiscible liquids.

Any porous body supported in the tank outlet will effect the separation. Hence for this purpose fine wire screening, glass or rock wool, terry cloth, or standard filtering media may be used.

It will be apparent that many modifications within the spirit of the disclosure and claims will suggest themselves to one skilled in the art and it is intended to include such within the scope of the claims herein appended.

I claim:

1. The method of separating liquid from a solidified gel thereof in a storage tank which comprises pumping liquid into the bottom of the tank under pressure, displacing the gel upwardly against a porous body in the tank outlet whereby to squeeze the solidified liquid out of the gel.

2. Method of separating an organic liquid from a solidified gel thereof in a storage tank which comprises pumping another liquid relatively immiscible therewith into the bottom of the tank under pressure sufficient to displace the gel upwardly against a porous body in the tank outlet whereby to squeeze the solidified liquid out of the gel.

SOL B. WICZER.

REFERENCES CITED

The following references are of record in the file of this patent:

UNITED STATES PATENTS

| Number | Name | Date |
|---|---|---|
| 1,262,808 | Keyt | Apr. 16, 1918 |
| 2,323,056 | Labour | June 29, 1943 |
| 2,385,361 | Laliberte | Sept. 25, 1945 |

FOREIGN PATENTS

| Number | Country | Date |
|---|---|---|
| 281,662 | Great Britain | Jan. 31, 1929 |
| 781,491 | France | Feb. 25, 1935 |